United States Patent
Li

(10) Patent No.: US 12,003,887 B2
(45) Date of Patent: Jun. 4, 2024

(54) IMAGE ENCODING METHOD, IMAGE ENCODER AND IMAGE TRANSMISSION SYSTEM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 338 days.

(21) Appl. No.: 17/467,364

(22) Filed: Sep. 6, 2021

(65) Prior Publication Data

US 2021/0400233 A1 Dec. 23, 2021

Related U.S. Application Data

(63) Continuation of application No. PCT/CN2020/077824, filed on Mar. 4, 2020.

(30) Foreign Application Priority Data

Mar. 6, 2019 (CN) .......................... 201910168160.X

(51) Int. Cl.
*H04N 7/12* (2006.01)
*H04N 19/105* (2014.01)
(Continued)

(52) U.S. Cl.
CPC ........... *H04N 7/125* (2013.01); *H04N 19/105* (2014.11); *H04N 19/159* (2014.11);
(Continued)

(58) Field of Classification Search
CPC .... H04N 7/125; H04N 19/105; H04N 19/159; H04N 19/172; H04N 19/184; H04N 19/30
(Continued)

(56) References Cited

U.S. PATENT DOCUMENTS 10,009,628 B2 6/2018 Bushell et al.
2007/0081789 A1* 4/2007 Winick ................ G11B 27/105
386/243

(Continued)

FOREIGN PATENT DOCUMENTS

| CN | 102724551 A | 10/2012 |
| CN | 103313017 A | 9/2013 |
| CN | 103428483 A | 12/2013 |
| CN | 105208342 A | 12/2015 |

(Continued)

OTHER PUBLICATIONS

The International Search Report dated Jun. 19, 2020; PCT/CN2020/077824 with English translation.

(Continued)

*Primary Examiner* — James T Boylan
(74) *Attorney, Agent, or Firm* — Frank Gao, Esq.

(57) ABSTRACT

Embodiments of the present invention relate to an encoding method, an image encoder and image transmission system. The encoding method includes: processing raw image data to obtain at least two channels of different output images; and performing multi-stream encoding on the at least two channels of output images, to form at least two corresponding channels of encoded data to support at least two types of service requirements. A multi-stream encoding manner is used in the encoding method, to adopt different encoding strategies for different service requirements thereby implementing services smoother while meeting the different service requirements.

14 Claims, 5 Drawing Sheets

(51) Int. Cl.
    *H04N 19/159*    (2014.01)
    *H04N 19/172*    (2014.01)
    *H04N 19/184*    (2014.01)
    *H04N 19/30*     (2014.01)

(52) U.S. Cl.
    CPC ......... *H04N 19/172* (2014.11); *H04N 19/184* (2014.11); *H04N 19/30* (2014.11)

(58) Field of Classification Search
    USPC .................................................. 375/240.02
    See application file for complete search history.

(56) References Cited

U.S. PATENT DOCUMENTS

2010/0166068 A1*   7/2010   Perlman ................ A63F 13/355
                                                           375/E7.243
2016/0286231 A1*   9/2016   Chen ...................... H04N 19/50

FOREIGN PATENT DOCUMENTS

| CN | 106169998 A | 11/2016 |
| --- | --- | --- |
| CN | 108243338 A | 7/2018 |
| CN | 109151481 A | 1/2019 |
| CN | 109819262 A | 5/2019 |

OTHER PUBLICATIONS

"Cheng Jiang", "Design of Abnormal Detection and Dual-stream-encoding Based Video Surveillance System", Published 2011 Computer Science; 4 pages.

* cited by examiner

IMAGE ENCODING METHOD, IMAGE ENCODER AND IMAGE TRANSMISSION SYSTEM

CROSS-REFERENCE TO RELATED APPLICATIONS

The present application is a continuation of the International Application No. PCT/CN2020/077824, filed on Mar. 4, 2020, which claims priority of Chinese patent No. 201910168160.X, filed on Mar. 6, 2019, both of which are hereby incorporated by reference in their entireties.

TECHNICAL FIELD

The present application relates to the field of image processing technologies, and in particular, to an encoding method, an image encoder and an image transmission system.

BACKGROUND

With the continuous development of electronic technologies, cameras have increasingly powerful performance, and can acquire images with increasingly high quality and resolution. Therefore, data volumes of video files or pictures acquired by cameras are also increasing.

According to different purposes or application fields of the cameras, there are many different service requirements based on the image data. For example, during communication of an aerial-photography unmanned aerial vehicle (UAV), a ground terminal needs to implement service requirements of remotely performing live video streaming in real time, remotely controlling a camera to record 4 K or higher-resolution video to a storage card, remotely playing back a video file in the camera, and supporting functions such as drag-and-drop and fast playback.

A relatively large data volume brings very severe challenges to implementation of the service requirements, especially for wireless transmission with a limited transmission bandwidth. Therefore, generally, a suitable image encoding method needs to be provided to encode and compress image data, to reduce bandwidth resources that need to be occupied.

However, different service requirements all have different use requirement features and different network transmission requirements. How to improve the performance of an image encoding method to meet diverse service requirements is a technical problem that needs to be resolved urgently.

SUMMARY

To resolve the foregoing technical problems, embodiments of the present invention provide an encoding method, an image encoder and an image transmission system, to meet diverse service requirements.

To resolve the foregoing technical problem, the embodiments of the present invention provide the following technical solutions. An encoding method is provided, applicable to an aerial camera.

The encoding method includes: processing raw image data to obtain at least two channels of different output images; and performing multi-stream encoding on the at least two channels of output images, to form at least two corresponding channels of encoded data to support at least two types of service requirements.

Alternatively, the encoding method includes: processing raw image data to obtain at least two channels of output images; and performing bitstream encoding on each channel of output images in the at least two channels of output images, to form at least two channels of encoded data, different channels of output images corresponding to different bitstreams, and the at least two channels of encoded data being used for supporting at least two types of service requirements, each channel of encoded data in the at least two channels of encoded data being used for supporting one of the at least two types of service requirements.

Optionally, the service requirements include video recording, online playback and remote live streaming; the at least two channels of output images include: a first output image, a second output image and a third output image; and the step of performing multi-stream encoding on the at least two channels of output images, to form at least two corresponding channels of encoded data to support at least two types of service requirements includes: performing first bitstream encoding on the first output image, to form first encoded data supporting the video recording; performing second bitstream encoding on the second output image, to form second encoded data supporting the online playback; and performing third bitstream encoding on the third output image, to form third encoded data supporting the remote live streaming.

Optionally, the first output image is a first image frame sequence with an original resolution; and the step of performing first bitstream encoding on the first output image, to form first encoded data supporting the video recording includes: determining at least one image frame in the first image frame sequence as a first key frame, an image frame between two first key frames being a first non-key frame; performing intra-frame compression encoding on the first key frame, to obtain a complete encoded frame; and performing inter-frame compression encoding on the non-key frame with reference to a previous image frame, to obtain a forward predictive encoded frame; and forming a plurality of consecutive encoded sequences based on the complete encoded frame and the forward predictive encoded frame, each encoded sequence including a complete encoded frame at the first position of the sequence and forward predictive encoded frames arranged in sequence.

Optionally, the method further includes: setting an encoding quality upper limit for the first bitstream encoding, to keep data traffic of the first encoded data within a specified range.

Optionally, the first bitstream encoding is variable bitrate encoding.

Optionally, the second output image is a second image frame sequence with a second resolution, the second resolution being lower than an original resolution; and the step of performing second bitstream encoding on the second output image, to form second encoded data supporting the online playback includes: determining at least one image frame in the second image frame sequence as a second key frame, an image frame between two second key frames being a second non-key frame; performing intra-frame compression encoding on the second key frame, to obtain a complete encoded frame; and performing inter-frame compression encoding on the second non-key frame in the form of frame skipping reference, to obtain a forward predictive encoded frame; and forming a plurality of consecutive encoded sequences based on the complete encoded frame and the forward predictive encoded frame, each encoded sequence including a complete encoded frame at the first position of the sequence and forward predictive encoded frames arranged in sequence.

Optionally, the step of performing inter-frame compression encoding on the second non-key frame in the form of frame skipping reference, to obtain a forward predictive encoded frame includes: selecting a to-be-encoded second non-key frame; determining one or more image frames before the to-be-encoded second non-key frame as a reference frame or reference frames according to a playback magnification setting of the online playback; calculating a difference between the to-be-encoded second non-key frame and the reference frame; and encoding the difference according to a preset compression algorithm, to obtain a forward predictive encoded frame corresponding to the to-be-encoded second non-key frame.

Optionally, a playback magnification of the online playback is a positive integer between 1 and K; and the step of determining one or more image frames before the to-be-encoded second non-key frame as a reference frame or reference frames according to a playback magnification setting of the online playback includes: determining 2 k image frames before the to-be-encoded second non-key frame as reference frames, k being a positive integer from 0 to K, k being calculated by using the following formulas:

$k=0$ when $\mod(n,2)=1$ $k=K$ when $\mod(n,2K)=0$ $k=z/2$ when $\mod(n,2)=0$ an image frame sequence number of the second key frame being set to 0, an image frame sequence number of the to-be-encoded second non-key frame being n, and $z=\mod(n, 2K)$.

Optionally, time axes of the first output image and the second output image are synchronized, and have the same start moment and the same end moment.

Optionally, the third output image is a third image frame sequence with a third resolution, the third resolution being lower than an original resolution, and the step of performing third bitstream encoding on the third output image, to form encoded data supporting the remote live streaming includes: determining at least one third key frame in the third image frame sequence, an image frame between two third key frames being a third non-key frame; performing intra-frame compression encoding on the third key frame, to obtain a complete encoded frame; and performing inter-frame compression encoding on the third non-key frame in the form of consecutive reference, to obtain a forward predictive encoded frame;

forming a plurality of consecutive encoded sequences based on the complete encoded frame and the forward predictive encoded frame, each encoded sequence including a complete encoded frame at the first position of the sequence and forward predictive encoded frames arranged in sequence; and dispersing macroblocks of the complete encoded frame of the each encoded sequence to one or more of the forward predictive encoded frames in the encoded sequence.

To resolve the foregoing technical problems, the embodiments of the present invention further provide the following technical solutions. An image encoder is provided, including a processor and a memory communicatively connected to the processor.

The memory stores computer program instructions, the computer program instructions, when invoked by the processor, causing the processor to perform the foregoing encoding method, to form at least two channels of encoded data to support at least two types of service requirements.

To resolve the foregoing technical problems, the embodiments of the present invention further provide the following technical solutions. An image transmission system is provided, including:

an image encoder, configured to perform the foregoing encoding method, to form at least two corresponding channels of encoded data; an image decoder, configured to receive and decode a part or all of the encoded data according to an operation instruction; and a communication module, connected to the image encoder and the image decoder, and configured to form a communication channel to transmit the encoded data.

Optionally, the image encoder includes a first bitstream encoding unit, a second bitstream encoding unit and a third bitstream encoding unit, the first bitstream encoding unit being configured to perform first bitstream encoding, to form first encoded data supporting video recording; the second bitstream encoding unit being configured to perform second bitstream encoding, to form second encoded data supporting online playback; and the third bitstream encoding unit being configured to perform third bitstream encoding, to form third encoded data supporting remote live streaming.

Optionally, the image transmission system further includes: a storage device, connected to the image encoder, and configured to store the first encoded data and the second encoded data.

Optionally, when performing the online playback, the image decoder is further configured to: receive, in the second encoded data according to a current playback magnification, a complete encoded frame of a key frame and a forward predictive encoded frame corresponding to a non-key frame of which an image frame sequence number has a remainder of 0 when divided by 2 k, k being the current playback magnification.

Optionally, when performing the online playback, the image decoder is further configured to: receive all the complete encoded frames in the second encoded data and discard all the forward predictive encoded frames when a current playback magnification is greater than K.

Optionally, when performing the online playback, the image decoder is further configured to: search the second encoded data for a key frame closest to a specified playback moment and receive subsequent encoded sequences by using the closest key frame as a starting point.

Compared with existing technologies, a multi-stream encoding manner is used in the encoding method provided in the embodiments of the present invention, to adopt different encoding strategies for different service requirements, thereby implementing services smoother while meeting the different service requirements.

BRIEF DESCRIPTION OF THE DRAWINGS

One or more embodiments are exemplarily described with reference to the corresponding figures in the accompanying drawings. The descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when an element is expressed as "being fixed to" another element, the element may be directly on the another element, or one or more intermediate elements may exist between the element and the another element. When one element is expressed as "being connected to" another element, the element may be directly connected to the another element, or one or more intermediate elements may exist between the element and the another element. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or element needs to have a particular orientation or needs to be constructed and operated in a particular orientation. Therefore, such terms should not be construed as limiting of the present invention. In addition, terms "first", "second" and "third" are only used for description purpose and cannot be understood as indicating or implying relative importance.

Unless otherwise defined, meanings of all technical and scientific terms used in this specification are the same as those generally understood by a person skilled in the technical field to which the present invention belongs. In this specification, terms used in the specification of the present invention are merely intended to describe objectives of the specific embodiments, and are not intended to limit the present invention. A term "and/or" used in this specification includes any or all combinations of one or more related listed items.

In addition, technical features involved in different embodiments of the present invention described below may be combined together if there is no conflict.

"Service requirement" refers to acquiring image data by using a camera or an image acquisition device, to implement, through data stream transmission, a functional application used for meeting use requirements of users. In a process of shooting image by using a camera, to implement one or more service requirements, for features of different service requirements, there are corresponding requirements for image compression encoding and transmission of compressed data.

For example, during remote live streaming, bitstreams of encoded data need to be stable without large fluctuations. During video reviewing, a form of encoded data needs to support a function such as dragging and dropping a progress bar, fast forwarding or fast playback.

Figure 1:
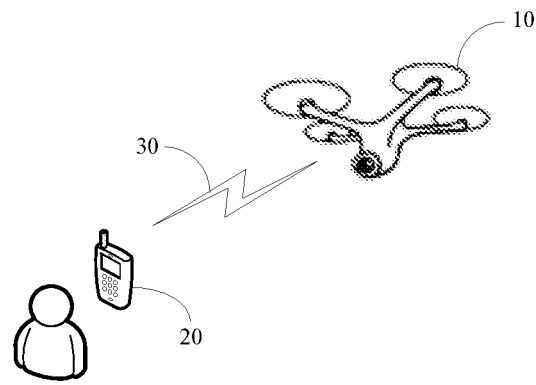
FIG. 1 is a schematic diagram of an application environment according to an embodiment of the present invention.

FIG. 1 shows an application scenario in which a service requirement is implemented according to an embodiment of the present invention. In the application scenario, an aerial camera carried on a UAV is used as an example. As shown in FIG. 1, the application scenario includes a UAV 10 carrying an aerial camera, a smart terminal 20 and a wireless network 30.

The UAV 10 may be any type of power-driven UAV, including, but not limited to, a quadrotor UAV, a fixed-wing aircraft and a helicopter model. The UAV may have a corresponding volume or power according to an actual requirement, to provide a load capacity, a flight speed, a flight mileage and the like that can meet a use requirement.

The aerial camera may be any type of image acquisition device, including a sports camera, a high-definition camera and a wide-angle camera. The aerial camera, as one of the functional modules carried on the UAV, may be mounted and fixed on the UAV through a mounting and fixing support such as a pan-tilt-zoom, and is controlled by the UAV 10 to perform an image acquisition task.

Certainly, one or more functional modules may be further added to the UAV, to enable the UAV to implement corresponding functions. For example, a built-in main control chip, as a control core or an image transmission apparatus of UAV flight, data transmission and the like, uploads acquired image information to a device that establishes a connection to the UAV.

The smart terminal 20 may be any type of smart device configured to establish a communication connection to the UAV, for example, a mobile phone, a tablet computer or a smart remote control. The smart terminal 20 may be equipped with one or more types of different user interaction apparatuses configured to acquire a user instruction or to present and feed back information to a user.

The interaction apparatuses include, but are not limited to, a button, a display screen, a touchscreen, a speaker and a remote control joystick. For example, the smart terminal 20 may be equipped with a touch display screen, receives a remote control instruction for the UAV from a user through the touch display screen, and presents, through the touch display screen, image information obtained by the aerial camera to the user. The user may further switch, by remotely controlling the touchscreen, the image information currently displayed on the display screen.

The wireless network 30 may be a wireless communication network configured to establish a data transmission channel between two nodes based on any type of data transmission principle, for example, a Bluetooth network, a Wi-Fi network, a wireless cellular network, or a combination thereof located in specified signal frequency bands.

Figure 2:
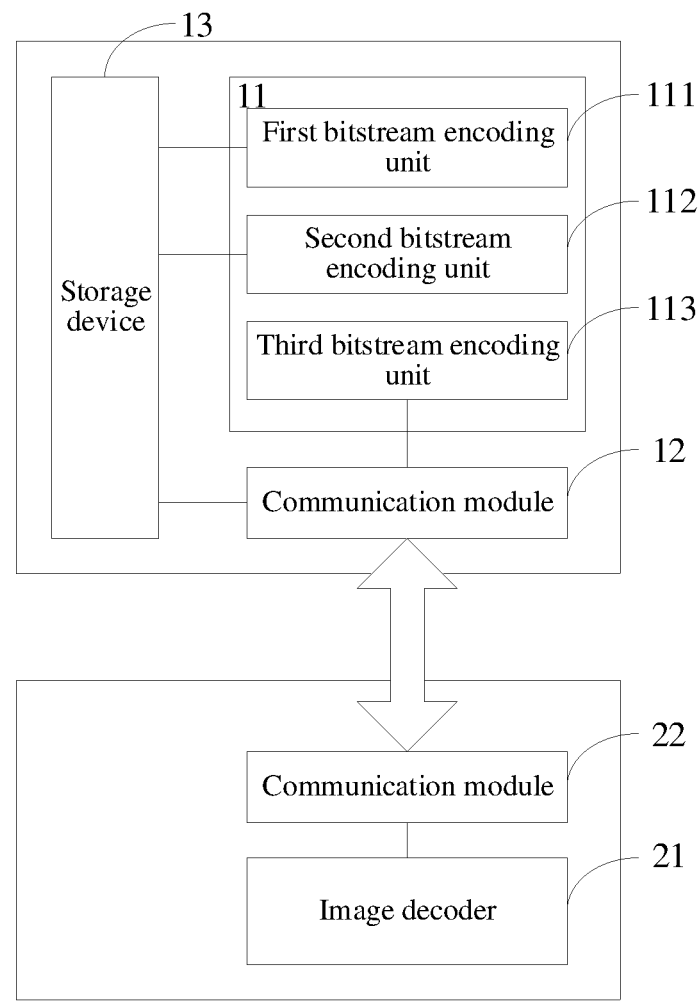
FIG. 2 is a structural block diagram of an image transmission system according to an embodiment of the present invention.

The image data transmission between the UAV 10 and the smart terminal 20 may be implemented by using a dedicated image transmission system (also referred to as "image transmission" for short). FIG. 2 is a structural block diagram of an image transmission system according to an embodiment of the present invention. As shown in FIG. 2, the image transmission system includes: an image encoder 11, an image decoder 21 and communication modules (12 and 22) disposed opposite to each other.

Figure 3:
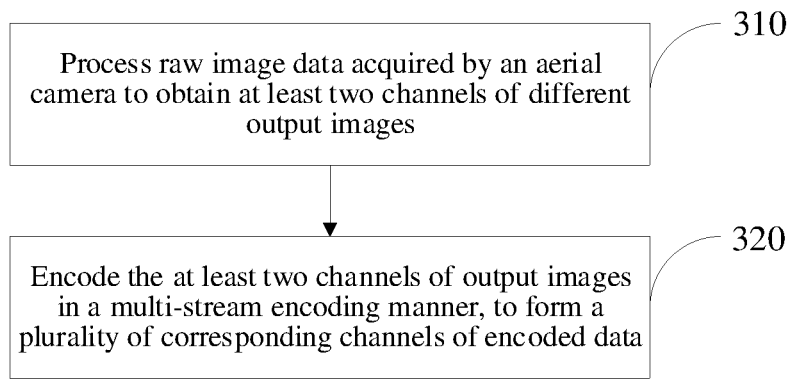
FIG. 3 is a method flowchart of an encoding method according to an embodiment of the present invention.

The image encoder 11 is a functional module disposed on one side of the UAV 10. The image encoder may perform the encoding method provided in the embodiments of the present invention to form a plurality of channels of encoded data, to respectively support different service requirements. FIG. 3 is a method flowchart of an encoding method according to an embodiment of the present invention. As shown in FIG. 3, the method includes the following steps:

310. Process raw image data acquired by an aerial camera to obtain at least two channels of different output images.

Each channel of output images may be represented in the form of a sequence of consecutive image frames. The output images are independent of each other and may have different image parameters or properties. For example, the two channels of output images may have different resolutions. Alternatively, a specific channel of images may be grayscale images. This depends on a processing process actually performed by the image encoder 11.

320. Encode the at least two channels of output images in a multi-stream encoding manner, to form a plurality of corresponding channels of encoded data.

"Multi-stream encoding" refers to an encoding manner of using different encoding strategies or encoding manners for different output images, to finally form a plurality of channels of different encoded data. Based on that channels of encoded data have different bitstream situations, to meet features of different service requirements, such a term "multi-stream encoding" is used herein to represent the foregoing encoding manner of using a plurality of encoding strategies simultaneously.

For example, bitstream encoding is performed on each channel of output images in the at least two channels of output images, to form at least two channels of encoded data, different channels of output images corresponding to different bitstreams, and the at least two channels of encoded data being used for supporting at least two types of service requirements, each channel of encoded data in the at least two channels of encoded data being used for supporting one of the at least two types of service requirements.

Based on the functional steps that need to be performed by the image encoder 11 disclosed according to this embodiment, a technician may implement the image encoder 11 by choosing to use corresponding software, hardware, or a combination of software and hardware, to perform one or more types of image processing (such as denoising, smoothing filtering or cropping) and encoding steps.

For example, the image encoder 11 may be implemented in such a structural form of a commonly used processor and a memory communicatively connected to the processor. The technician may write computer program instructions, and then record and store the computer program instructions in the memory. The computer program instructions, when invoked by the processor, cause the processor to perform corresponding multi-stream encoding to form at least two channels of encoded data, to support at least two types of service requirements.

The communication module 12 is a functional module disposed on the UAV 10 and adapted to the wireless network 30. The UAV 10 may be added to the wireless network 30 by using the communication module 12, and send or receive, as one of nodes of the network, data through a communication channel provided by the wireless network 30.

The image decoder 21 is configured to receive and decode a part or all of the encoded data according to an operation instruction. Similar to the image encoder 11, the image decoder 21 may also be implemented by choosing to use corresponding software, hardware, or a combination of software and hardware.

The operation instruction is an instruction input by a user on the smart terminal 20 and related to the implementation of the service requirements, and is configured to select a function or control an adjustable parameter. Based on different operation instructions, the image decoder 21 may request to receive or download corresponding encoded data, and use a decoding algorithm adapted to the encoded data to obtain required image data.

A communication module 22 is a functional module disposed opposite to the communication module 12. The smart terminal 20 may further be added to the wireless network 30 by using the communication module 22, and is used as another node of the wireless network. Based on a communication channel established between the communication modules (12 and 22), the image encoder 11 and the image decoder 21 exchange data, for example, deliver encoded data or upload an operation instruction.

Based on the foregoing image transmission system, many different function applications may be provided or implemented in the application scenario, to meet corresponding service requirements.

For example, the UAV 10 may implement a video recording function. The video recording function refers to storing image data acquired by the aerial camera in one or more storage devices, so that the image data may be read or copied to other terminal devices for playback. A specific implementation process of the video recording function is roughly to first perform compression encoding on image information acquired or captured by the UAV 10 by using the aerial camera, and then store compression encoded data in a mass storage device (for example, an SD card) of the UAV, to form a video file.

In some embodiments, online playback may further be implemented between the UAV 10 and the smart terminal 20.

The online playback refers to a function that the user, by using the smart terminal 20, quickly browses the video file previously captured or acquired by the UAV 10, to roughly learn of content of the video file that has been recorded. An implementation process is roughly as follows: First, the image information acquired or captured by the UAV 10 by using the aerial camera is compressed, encoded and stored to form video files. Then, the smart terminal 20 may obtain the video files online through a wireless communication network, and display the video files to the user. In the online playback function, a function of drag-and-drop, fast forwarding or fast playback needs to be supported.

In some other embodiments, remote live streaming may be implemented between the UAV 10 and the smart terminal 20. The remote live streaming refers to a function of playing, in real time on the smart terminal 20 through wireless transmission of the communication module, an image captured by the aerial camera. A specific implementation process is as follows: First, image information acquired or captured by the UAV 10 by using the aerial camera is compression encoded to be provided to the smart terminal 20 through wireless communication. Then, after decoding the image information which is compression encoded to be provided to the smart terminal 20, the smart terminal 20 synchronously presents the image information in real time to the user through the display screen, thereby implementing the function of remote live streaming.

Corresponding to the foregoing three function requirements (the remote live streaming, the video recording and the online playback), still referring to FIG. 2, the image encoder 11 may include at least a first bitstream encoding unit 111, a second bitstream encoding unit 112 and a third bitstream encoding unit 113.

The first bitstream encoding unit 111 is configured to perform first bitstream encoding, to form first encoded data supporting the video recording. The second bitstream encoding unit 112 is configured to perform second bitstream encoding, to form second encoded data supporting the online playback. The third bitstream encoding unit 113 is configured to perform third bitstream encoding, to form third encoded data supporting the remote live streaming.

In this embodiment, the image encoder 11 separately performs targeted encoding by respectively adopting different bitstream encoding units for different functional requirements and application features. In the form of multi-stream encoding, all the function requirements can be taken into account, so that the bitstream transmission is smoother.

Still referring to FIG. 2, during implementation of the functions of the video recording and the video playback, the image transmission system may further include a storage device 13.

The storage device 13 is connected to the image encoder 11, and is configured to store the first encoded data and the second encoded data. When the user sends a corresponding operation instruction by using the smart terminal 20, the storage device may send, by using the communication module, at least a part of encoded data to the smart terminal 20 for display.

The storage device 13 may be any suitable type of non-volatile storage device, and is configured to provide enough storage space to store all acquired original data. The storage device includes, but not limited to, an SD card, an SSD hard disk, a mechanical hard disk or a flash memory. In this embodiment, the storage device 13 is an SD card.

Specifically, a suitable quantity of storage devices 13 may be further selected according to an actual requirement. For example, there may be two storage devices, configured to store the first bitstream encoded data or the second bitstream encoded data respectively. Certainly, the storage device 13 may alternatively directly be a storage space or a storage device provided by other systems in the UAV, provided that requirements of data storage capacity and a data read-write speed can be met.

The application environment shown in FIG. 1 only shows the application of the image transmission system on the UAV. A person skilled in the art can understand that the image transmission system may further be carried on other types of mobile vehicles (for example, a remote control car) to perform the same functions. The inventive idea about the image transmission system disclosed in the embodiments of the present invention is not limited to the application on the UAV shown in FIG. 1.

Specific processes in which the first bitstream encoding unit 111 performs first bitstream encoding, the second bitstream encoding unit 112 performs second bitstream encoding, and the third bitstream encoding unit 113 performs third bitstream encoding are separately described below with reference to the data transmission features of the functions such as the remote live streaming, the video recording and the video playback.

Figure 4:
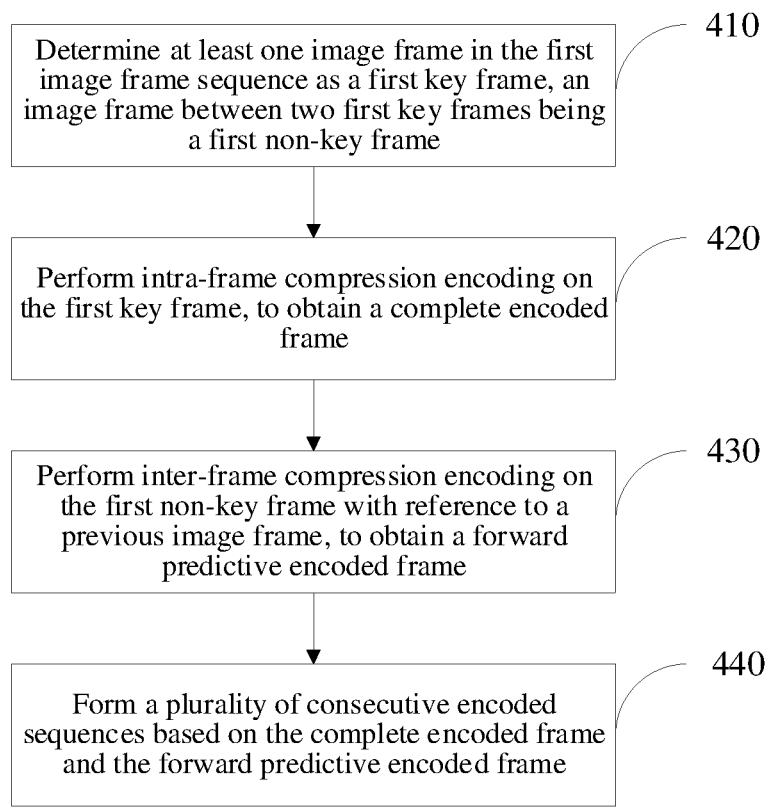
FIG. 4 is a method flowchart of a first encoding method according to an embodiment of the present invention.
Figure 5:
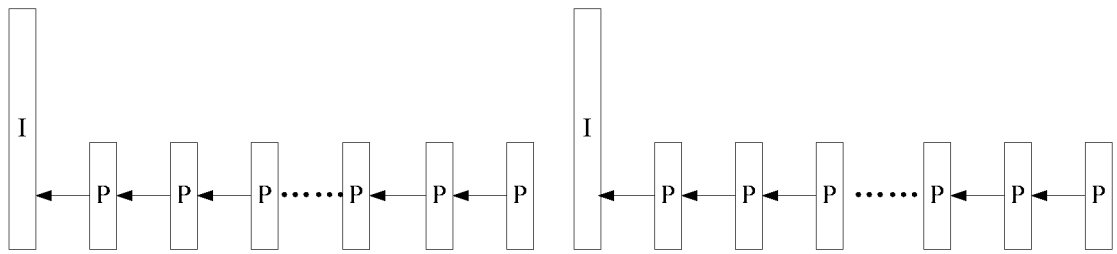
FIG. 5 is a schematic diagram of first encoded data according to an embodiment of the present invention.

FIG. 4 is a flowchart of a first bitstream encoding method according to an embodiment of the present invention. FIG. 5 is a schematic diagram of a data structure of first encoded data. Output images used in the first bitstream encoding is a first image frame sequence with an original resolution and very high definition. As shown in FIG. 4, the method includes the following steps:

410. Determine at least one image frame in the first image frame sequence as a first key frame, an image frame between two first key frames being a first non-key frame.

Due to factors such as a high sampling rate in a sequence of consecutive image frames, most of image frames in the sequence are very similar to each other. Many encoding forms use such a characteristic to compress image frame data as much as possible by selecting and compressing (for example, H264/H265 encoding) the key frame and the non-key frame.

The first key frame is an image frame that serves as an anchor point in the image frame sequence, and may be used for correcting accumulated errors. The first key frame is generally an image frame having significantly changed image screen in the image frame sequence. The first non-key frame is an image frame located between the key frames.

420. Perform intra-frame compression encoding on the first key frame, to obtain a complete encoded frame.

The intra-frame compression encoding refers to performing image compression encoding on only a spatial domain of the first key frame. The obtained complete encoded frame I may be independently decoded to recover a corresponding key frame image. A compression rate of such intra-frame compression encoding is relatively small.

430. Perform inter-frame compression encoding on the first non-key frame with reference to an image frame before the first non-key frame, to obtain a forward predictive encoded frame.

The inter-frame compression encoding refers to a manner of performing compression encoding according to a difference between two successive image frames. The finally obtained forward predictive encoded frame P records only the difference between the image frame and the previous image frame, and can only be decoded by relying on the reference image frame. In this embodiment, encoded data obtained by performing inter-frame compression encoding on each first non-key frame is referred to as a "forward predictive encoded frame".

440. Form a plurality of consecutive encoded sequences based on the complete encoded frame and the forward predictive encoded frame.

As shown in FIG. 5, through step 410 to step 430, the first image frame sequence may be organized to form a plurality of consecutive encoded sequences. Each encoded sequence includes a complete encoded frame I at the first position of the sequence and forward predictive encoded frames P arranged in sequence.

Certainly, the foregoing steps may alternatively be adjusted or integrated according to an actual situation. It only needs to organize to form an encoded data structure shown in FIG. 5. For example, the encoded data structure may be a bitstream in a common IP mode of H264/H265 encoding.

The video file obtained in such an encoding manner may be exported by the user to different platforms and players for playback, and has better compatibility and is applicable to a plurality of scenarios. Preferably, the first bitstream encoding is variable bitrate encoding, to ensure the stability of image quality of the bitstream.

In some embodiments, the first encoded data adopts an original resolution and has a relatively high resolution. A bit rate of the bitstream is very high, and is close to a maximum writing rate of a storage device (for example, an SD card). Therefore, an encoding quality upper limit may be set for the first bitstream encoding, to keep data traffic of the first encoded data within a specified range, and prevent the data traffic from exceeding a storage limit of the storage card due to a sudden exception of the bitstream. Specifically, the encoding quality upper limit is an empirical value, and may be set or adjusted by a person skilled in the art according to an actual situation.

Figure 6:
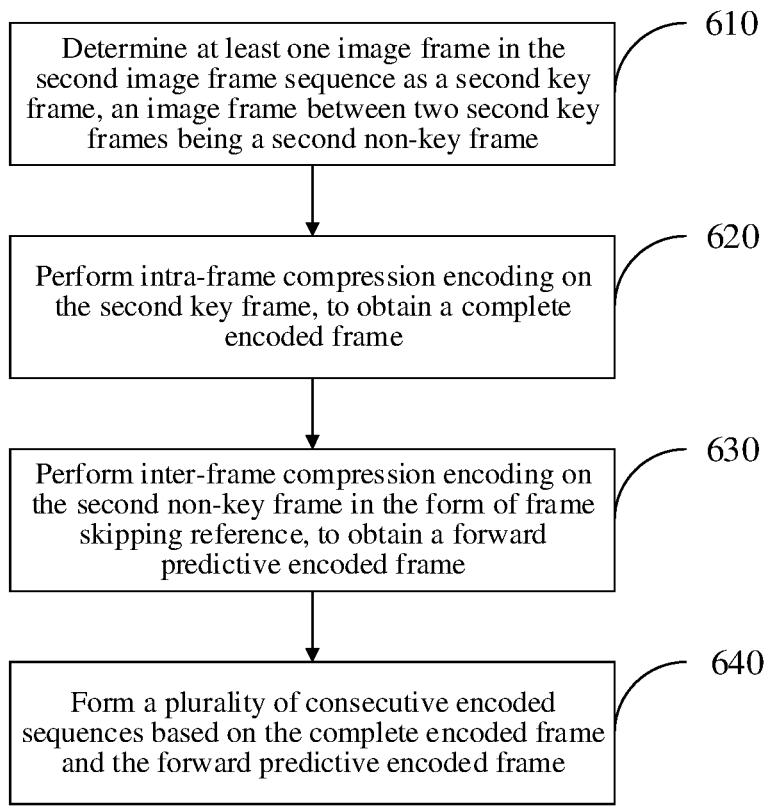
FIG. 6 is a method flowchart of a second encoding method according to an embodiment of the present invention.
Figure 7:
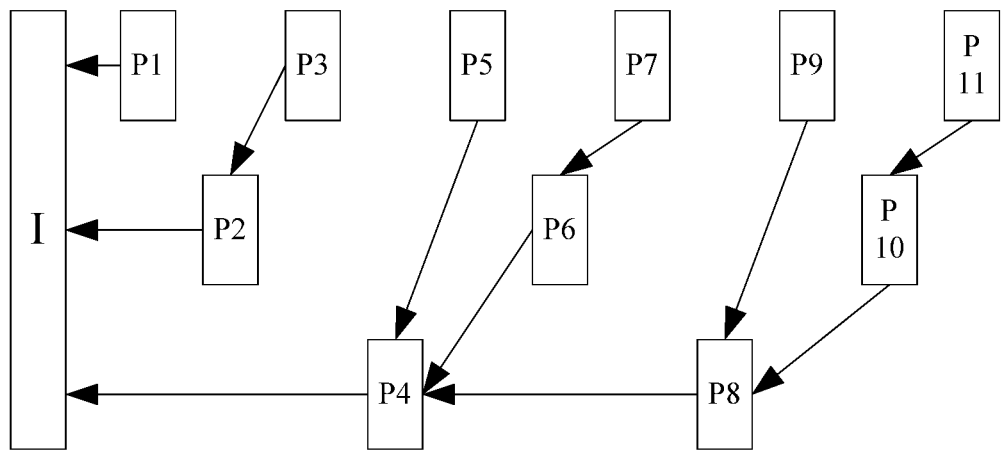
FIG. 7 is a schematic diagram of second encoded data according to an embodiment of the present invention.

FIG. 6 is a flowchart of a second bitstream encoding method according to an embodiment of the present invention. FIG. 7 is a schematic diagram of second encoded data according to an embodiment of the present invention. A second output image used in the second bitstream encoding is a second image frame sequence with a relatively low resolution (for example, 720p), to implement a function of online playback. In some embodiments, to keep the function of the online playback and video data aligned and consistent, time axes of the first output image and the second output image are synchronized, and have the same start moment and the same end moment.

As shown in FIG. 6, the method includes the following steps:

610. Determine at least one image frame in the second image frame sequence as a second key frame, an image frame between two second key frames being a second non-key frame.

Similar to the first bitstream encoding manner, the second image frame sequence is also organized into a plurality of different units in a manner of choosing and determining the second key frame during second bitstream encoding.

620. Perform intra-frame compression encoding on the second key frame, to obtain a complete encoded frame.

630. Perform inter-frame compression encoding on the second non-key frame in the form of frame skipping reference, to obtain a forward predictive encoded frame.

During inter-frame compression encoding, data is a difference between the current second non-key frame and a previous reference frame. Different from a manner in which each non-key frame uses a previous image frame as a reference frame and that is adopted by the first bitstream encoding manner in that: as shown in FIG. 7, "frame skipping reference" means that the second non-key frame uses previous one or more image frames as a reference frame or reference frames instead of the previous image frame as the reference frame.

In some embodiments, a specific form of the frame skipping reference may be defined by a playback magnification of the online playback. A specific method procedure is as follows:

First, a to-be-encoded second non-key frame is selected. Then, one or more image frames before the to-be-encoded second non-key frame are determined as a reference frame or reference frames according to a playback magnification setting of the online playback. In addition, a difference between the to-be-encoded second non-key frame and the reference frame is calculated.

The playback magnification refers to a ratio of a playback speed during online playback performed by the smart terminal 20 to a normal playback speed of a video file. The playback magnification is used for providing an adjustment range of the playback speed. Generally, the playback magnification is an integer value such as 1, 2 or 3.

Finally, the difference is encoded according to a preset compression algorithm, to obtain a forward predictive encoded frame corresponding to the to-be-encoded second non-key frame.

Specifically, any suitable compression algorithm may be selected according to an actual requirement, to encode the difference between two image frames.

640. Form a plurality of consecutive encoded sequences based on the complete encoded frame and the forward predictive encoded frame.

As shown in FIG. 7, each encoded sequence includes a complete encoded frame I at the first position of the sequence and forward predictive encoded frames P arranged in sequence, a reference frame of each forward predictive encoded frame being an image frame to which an arrow points.

When decoding each forward predictive encoded frame P, the image decoder needs to rely on the reference frame. Only the complete encoded frame I can be decoded without relying on another image frame. Therefore, the structure of the encoded data shown in FIG. 7 is actually quite beneficial to the implementation of playback speed adjustment or a drag-and-drop operation during online playback.

For example, when the user performs a drag-and-drop operation on the smart terminal 20, after determining a specified playback moment corresponding to a drag-and-drop instruction inputted by the user, the image decoder may search for a key frame closest to the specified playback moment. Then, using the closest key frame as a starting point, only subsequent encoded sequences need to be received, thereby reducing the volume of data that needs to be transmitted by the communication module.

When the user needs to speed up the playback, the image decoder may skip a plurality of intermediate consecutive forward predictive encoded frames according to a playback magnification selected by the user, and only receive some forward predictive encoded frames for decoding, thereby also reducing the volume of data that needs to be transmitted by the communication module.

A process of how the second encoded data can reduce a network transmission capacity during drag-and-drop and playback speed adjustment is described below in detail with reference to a specific example shown in FIG. 7.

For an image frame sequence at a normal playback speed, the function of the online playback at a high playback magnification may be implemented in the form of skipping one or more image frames. Assuming that the playback magnification supported by the function of the online playback is a positive integer between 1 and K, in each image frame sequence, an image frame sequence number of the second key frame is set to 0, an image frame sequence number of the to-be-encoded second non-key frame being n.

To meet a case that a corresponding index can be found in the image frame sequence at different playback magnifications without requesting other redundant second non-key frames, 2 k image frames before the to-be-encoded second non-key frame can be determined as reference frames, a value of k being calculated by using the following piecewise function:

$k=0$ when $\mathrm{mod}(n,2)=1$ $k=K$ when $\mathrm{mod}(n,2K)=0$ $k=z/2$ when $\mathrm{mod}(n,2)=0$ where mod is a modulo function, and is used for calculating a remainder of division between two, $z=\mathrm{mod}(n, 2K)$. In such a reference frame determining manner, actually, all the second non-key frames are divided into (K+1) classes based on a reference dependency relationship.

FIG. 7 is a schematic diagram of reference frames when the playback magnification K is 2. As shown in FIG. 7, for each non-key frame, an image frame to which an arrow points is a reference frame of the second non-key frame.

Correspondingly, the second non-key frames may be divided into three classes. A first class is non-key frames of which sequence numbers are odd numbers, is located at a bottom level, and can be randomly discarded because the first class can be discarded without affecting the decoding of other frames. A second class is non-key frames of which sequence numbers are 2, 6, 10 and the like (not exactly divisible by 4), is located at a middle level, and affects the decoding of adjacent frames when being discarded. A third class is non-key frames of which sequence numbers are 4 and 8 (divisible by 4), and cannot be discarded.

Based on the second encoded data formed in the foregoing manner of "frame skipping reference", when the smart terminal 20 performs online playback, the image decoder may choose to receive, according to a current playback magnification k, a complete encoded frame I of a key frame and a forward predictive encoded frame P corresponding to a second non-key frame of which an image frame sequence number has a remainder of 0 when divided by 2 k instead of receiving all the forward predictive encoded frames.

For example, when k (that is, the current playback magnification) is 1, as shown in FIG. 4, the image decoder may receive only a complete encoded frame 0 and forward predictive encoded frames 2, 4, 6, 8, 10 and 12 in each image frame sequence, and completes the decoding of the encoded data based on the reference dependency relationship, so that the video file is played at a playback magnification that is greater than 1 times the normal playback speed.

In some other embodiments, when the current playback magnification is greater than K, the image decoder may receive only the complete encoded frame I and discard all the forward predictive encoded frames, to perform online playback at a higher playback speed.

Figure 8:
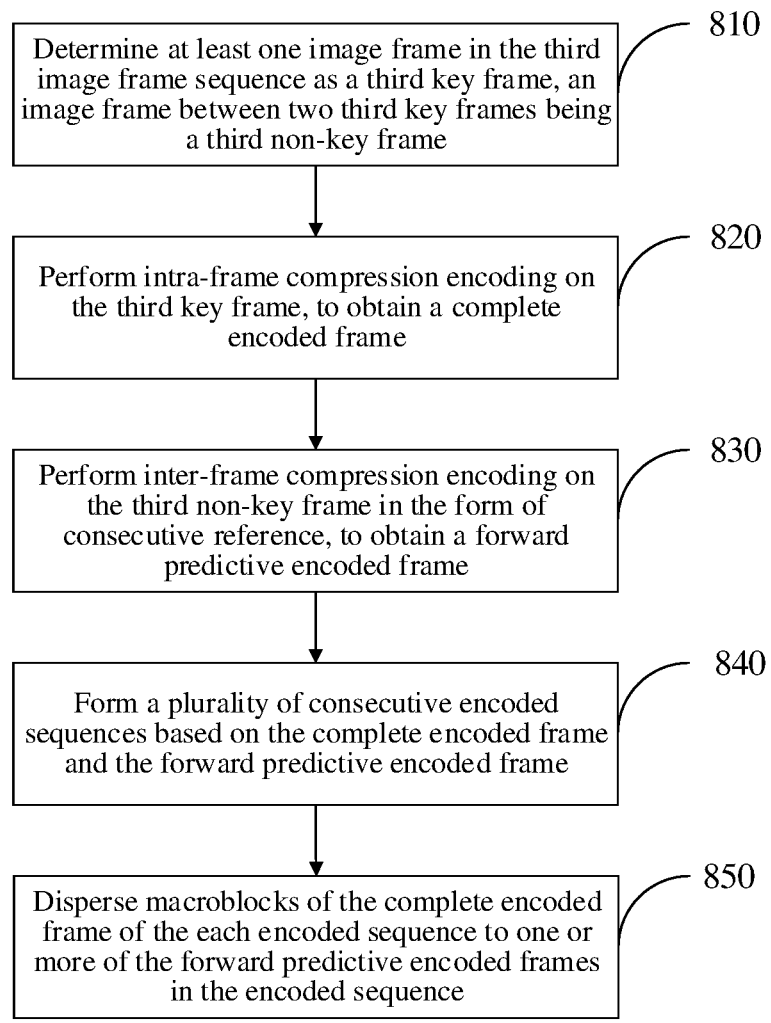
FIG. 8 is a method flowchart of a third encoding method according to an embodiment of the present invention.
Figure 9:
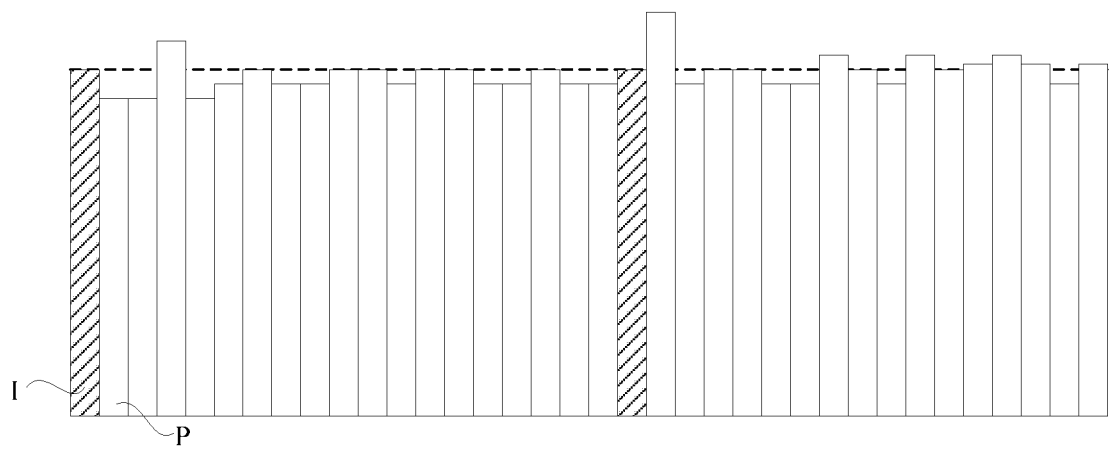
FIG. 9 is a schematic diagram of third encoded data according to an embodiment of the present invention.

FIG. 8 is a flowchart of a third bitstream encoding method according to an embodiment of the present invention. FIG. 9 is a schematic diagram of third encoded data according to an embodiment of the present invention. Limited by network traffic and the like of remote live streaming, a third output image used in third bitstream encoding is a third image frame sequence with a relatively low resolution (for example, 720p).

As shown in FIG. 8, the third bitstream encoding method may include the following steps:

810. Determine at least one third key frame in the third image frame sequence, an image frame between two key frames being a third non-key frame.

820. Perform intra-frame compression encoding on the third key frame, to obtain a complete encoded frame.

830. Perform inter-frame compression encoding on the third non-key frame in the form of consecutive reference, to obtain a forward predictive encoded frame.

The "consecutive reference" means that each third non-key frame uses a previous image frame as a reference frame. A reference manner as the same as that in the first bitstream encoding shown in FIG. 6 is adopted.

840. Form a plurality of consecutive encoded sequences based on the complete encoded frame and the forward predictive encoded frame.

Each encoded sequence includes a complete encoded frame at the first position of the sequence and forward predictive encoded frames arranged in sequence, and is used as a component unit of the third encoded data. The complete encoded frame and the forward predictive encoded frames adopt different encoding manners, and have a significant difference in terms of the data volume or the frame size.

850. Disperse macroblocks of the complete encoded frame of the each encoded sequence to one or more of the forward predictive encoded frames in the encoded sequence.

The "macroblock" is a part of data divided from the complete encoded frame according to a specified data division criterion. As shown in FIG. 9, macroblocks of the complete encoded frame I are dispersed to forward predictive encoded frames P, so that the sizes of frames are made relatively average, and a bit rate during transmission is very stable, leading to relatively small impact on the network, which is suitable for long-distance wireless communication transmission.

In summary, the image encoding method provided in the embodiments of the present invention, for the features that video files need to be read by users frequently, and are adapted to being decoded and played in different environments, the most common IP mode encoding (such as H265/H264) is adopted while taking the write capability of the storage device into account.

For requirements of operations of drag-and-drop and fast playback during online playback, the reference frames of the second non-key frames are determined in the manner of frame skipping reference, to reduce a quantity of image frames that the image decoder needs to receive, and reduce download load of the wireless communication network.

In addition, in consideration of the complexity of the wireless network remote transmission during remote live streaming and the restriction that the bitstream cannot have a large fluctuation, the macroblocks of the complete encoded frames are dispersed to the forward predictive frames in a macroblock dispersing manner, thereby keeping the bit rate stable, and reducing the impact on the network.

A person skilled in the art may further learn that the steps in the exemplary image encoding method described with reference to the embodiments disclosed in this specification can be implemented by electronic hardware, computer software, or a combination thereof. To clearly describe the interchangeability between the hardware and the software, the compositions and the steps of the examples have been generally described according to functions in the foregoing descriptions. Whether the functions are executed in a manner of hardware or software depends on particular applications and design constraint conditions of the technical solutions.

A person skilled in the art may use different methods to implement the described functions for each particular application, but it should not be considered that the implementation goes beyond the scope of the present invention. The computer software may be stored in a computer-readable storage medium. The program, when being executed, may include the procedures of the embodiments of the foregoing methods. The storage medium may be a magnetic disk, an optical disc, a read-only memory (ROM), or a random access memory (RAM).

Finally, it should be noted that the foregoing embodiments are merely used for describing the technical solutions of the present invention, but are not intended to limit the present invention. Under the concept of the present invention, the technical features in the foregoing embodiments or different embodiments may be combined. The steps may be implemented in any sequence. There may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An encoding method, applied to an aerial camera, the method comprising:
processing raw image data to obtain at least three channels of output images; and
performing bitstream encoding on each channel of output images in the at least three channels of output images, to form at least three channels of encoded data, different channels of output images corresponding to different bitstreams, and the at least three channels of encoded data being configured for supporting at least three types of service requirements, each channel of encoded data in the at least three channels of encoded data being configured for supporting one of the at least three types of service requirements;
wherein the service requirements comprise video recording, online playback and remote live streaming; the at least three channels of output images comprise: a first output video image, a second output video image and a third output video image; and
the step of performing bitstream encoding on each channel of output images in the at least three channels of output images, to form at least three channels of encoded data comprises:
performing first bitstream encoding on the first output video image, to form first encoded data supporting the video recording;
performing second bitstream encoding on the second output video image, to form second encoded data supporting the online playback; and
performing third bitstream encoding on the third output video image, to form third encoded data supporting the remote live streaming;
wherein the first output video image is a first image frame sequence with an original resolution; at least one image frame in the first image frame sequence is a first key frame; the second output video image is a second image frame sequence with a second resolution, the second resolution being lower than an original resolution;
the step of performing second bitstream encoding on the second output video image, to form second encoded data supporting the online playback comprises:
determining at least one image frame in the second image frame sequence as a second key frame, an image frame between two second key frames being a second non-key frame;
performing intra-frame compression encoding on the second key frame, to obtain a complete encoded frame; and
performing inter-frame compression encoding on the second non-key frame in the form of frame skipping reference, to obtain a forward predictive encoded frame of the second output video image;
forming a plurality of consecutive encoded sequences based on the complete encoded frame of the second output video image and the forward predictive encoded frame of the second output video image, each encoded sequence comprising a complete encoded frame at the first position of the sequence and forward predictive encoded frames of the second output video image arranged in sequence
wherein the step of performing inter-frame compression encoding on the second non-key frame in the form of frame skipping reference, to obtain the forward predictive encoded frame of the second output video image comprises:
selecting a to-be-encoded second non-key frame;
determining one or more image frames before the to-be-encoded second non-key frame as a reference frame or reference frames according to a playback magnification setting of the online playback;
calculating a difference between the to-be-encoded second non-key frame and the reference frame; and
encoding the difference according to a preset compression algorithm, to obtain the forward predictive encoded frame of the second output video image corresponding to the to-be-encoded second non-key frame.

2. The method according to claim 1, wherein the first output video image is a first image frame sequence with an original resolution; and
the step of performing first bitstream encoding on the first output video image, to form first encoded data supporting the video recording comprises:
determining at least one image frame in the first image frame sequence as the first key frame, an image frame between two first key frames being a first non-key frame;
performing intra-frame compression encoding on the first key frame, to obtain a complete encoded frame;
performing inter-frame compression encoding on the first non-key frame with reference to an image frame before the first non-key frame, to obtain a forward predictive encoded frame of the first output video image; and
forming a plurality of consecutive encoded sequences based on the complete encoded frame of the first output video image and the forward predictive encoded frame of the first output video image, each encoded sequence comprising a complete encoded frame at the first position of the sequence and forward predictive encoded frames of the first output video image arranged in sequence.

3. The method according to claim 1, further comprising:
setting an encoding quality upper limit for the first bitstream encoding, to keep data traffic of the first encoded data within a specified range.

4. The method according to claim 1, wherein the first bitstream encoding is variable bitrate encoding.

5. The method according to claim 1, wherein a playback magnification of the online playback is a positive integer between 1 and K; and
the step of determining one or more image frames before the to-be-encoded second non-key frame as a reference frame or reference frames according to a playback magnification setting of the online playback comprises:
determining 2k image frames before the to-be-encoded second non-key frame as reference frames, k being a positive integer from 0 to K, k being calculated by using the following formulas:

$k=0$ when $\mod(n,2)=1$ $k=K$ when $\mod(n,2K)=0$ $k=z/2$ when $\mod(n,2)=0$ an image frame sequence number of the second key frame being set to 0, an image frame sequence number of the to-be-encoded second non-key frame being n, and $z=\mod(n, 2K)$.

6. The method according to claim 1, wherein time axes of the first output video image and the second output video image are synchronized, and have the same start moment and the same end moment.

7. The method according to claim 1, wherein the third output video image is a third image frame sequence with a third resolution, the third resolution being lower than an original resolution, and the step of performing third bitstream encoding on the third output video image, to form third encoded data supporting the remote live streaming comprises:

determining at least one third key frame in the third image frame sequence, an image frame between two third key frames being a third non-key frame;

performing intra-frame compression encoding on the third key frame, to obtain a complete encoded frame of the third output video image; and performing inter-frame compression encoding on the third non-key frame in the form of consecutive reference, to obtain a forward predictive encoded frame of the third output video image;

forming a plurality of consecutive encoded sequences based on the complete encoded frame of the third output video image and the forward predictive encoded frame of the third output video image, each encoded sequence comprising a complete encoded frame at the first position of the sequence and forward predictive encoded frames of the third output video image arranged in sequence; and dispersing macroblocks of the complete encoded frame of the each encoded sequence to one or more of the forward predictive encoded frames of the third output video image in the encoded sequence.

8. An image encoder, comprising a processor and a memory communicatively connected to the processor, the memory storing computer program instructions, the computer program instructions, when invoked by the processor, causing the processor to perform the following steps:

processing raw image data to obtain at least three channels of output images; and performing bitstream encoding on each channel of output images in the at least three channels of output images, to form at least three channels of encoded data, different channels of output images corresponding to different bitstreams, and the at least three channels of encoded data being configured for supporting at least three types of service requirements, each channel of encoded data in the at least three channels of encoded data being configured for supporting one of the at least three types of service requirements;

wherein the service requirements comprise video recording, online playback and remote live streaming; the at least three channels of output images comprise: a first output video image, a second output video image and a third output video image; and the step of performing bitstream encoding on each channel of output images in the at least three channels of output images, to form at least three channels of encoded data comprises:

performing first bitstream encoding on the first output video image, to form first encoded data supporting the video recording;

performing second bitstream encoding on the second output video image, to form second encoded data supporting the online playback; and performing third bitstream encoding on the third output video image, to form third encoded data supporting the remote live streaming;

wherein the first output video image is a first image frame sequence with an original resolution; at least one image frame in the first image frame sequence is a first key frame; the second output video image is a second image frame sequence with a second resolution, the second resolution being lower than an original resolution;

the step of performing second bitstream encoding on the second output video image, to form second encoded data supporting the online playback comprises:

determining at least one image frame in the second image frame sequence as a second key frame, an image frame between two second key frames being a second non-key frame;

performing intra-frame compression encoding on the second key frame, to obtain a complete encoded frame; and performing inter-frame compression encoding on the second non-key frame in the form of frame skipping reference, to obtain a forward predictive encoded frame of the second output video image;

forming a plurality of consecutive encoded sequences based on the complete encoded frame of the second output video image and the forward predictive encoded frame of the second output video image, each encoded sequence comprising a complete encoded frame at the first position of the sequence and forward predictive encoded frames of the second output video image arranged in sequence wherein the step of performing inter-frame compression encoding on the second non-key frame in the form of frame skipping reference, to obtain the forward predictive encoded frame of the second output video image comprises:

selecting a to-be-encoded second non-key frame;

determining one or more image frames before the to-be-encoded second non-key frame as a reference frame or reference frames according to a playback magnification setting of the online playback;

calculating a difference between the to-be-encoded second non-key frame and the reference frame; and encoding the difference according to a preset compression algorithm, to obtain the forward predictive encoded frame of the second output video image corresponding to the to-be-encoded second non-key frame.

9. The image encoder according to claim 8, wherein time axes of the first output video image and the second output video image are synchronized, and have the same start moment and the same end moment.

10. An image transmission system, comprising:

an image encoder, configured to:

process raw image data to obtain at least three channels of output images; and perform bitstream encoding on each channel of output images in the at least three channels of output images, to form at least three channels of encoded data, different channels of output images corresponding to different bitstreams, and the at least three channels of encoded data being configured for supporting at least three types of service requirements, each channel of encoded data in the at least three channels of encoded data being configured for supporting one of the at least three types of service requirements;

an image decoder, configured to receive and decode a part or all of the encoded data according to an operation instruction; and a communication module, connected to the image encoder and the image decoder, and configured to form a communication channel to transmit the encoded data;

wherein the image encoder comprises a first bitstream encoding unit, a second bitstream encoding unit and a third bitstream encoding unit, the first bitstream encoding unit being configured to perform first bitstream encoding, to form first encoded data supporting video recording; the second bitstream encoding unit being configured to perform second bitstream encoding, to form second encoded data supporting online playback; and the third bitstream encoding unit being configured to perform third bitstream encoding, to form third encoded data supporting remote live streaming;

wherein when perform the online playback, the image decoder is further configured to:

receive, in the second encoded data according to a current playback magnification, a complete encoded frame of a key frame and a forward predictive encoded frame corresponding to a non-key frame of which an image frame sequence number has a remainder of 0 when divided by 2 k, k being the current playback magnification.

11. The image transmission system according to claim 10, further comprising: a storage device, connected to the image encoder, and configured to store the first encoded data and the second encoded data.

12. The image transmission system according to claim 10, wherein when performing the online playback, the image decoder is further configured to: receive all the complete encoded frames in the second encoded data and discard all the forward predictive encoded frames when a current playback magnification is greater than K.

13. The image transmission system according to claim 10, wherein when performing the online playback, the image decoder is further configured to:

search the second encoded data for a key frame closest to a specified playback moment and receive subsequent encoded sequences by using the closest key frame as a starting point.

14. The image transmission system according to claim 10, wherein the service requirements comprise video recording, online playback and remote live streaming; the at least three channels of output images comprise: a first output video image, a second output video image and a third output video image; and the step of performing bitstream encoding on each channel of output images in the at least three channels of output images, to form at least three channels of encoded data comprises:

performing first bitstream encoding on the first output video image, to form first encoded data supporting the video recording;

performing second bitstream encoding on the second output video image, to form second encoded data supporting the online playback; and performing third bitstream encoding on the third output video image, to form third encoded data supporting the remote live streaming.

* * * * *